(12) United States Patent
Felton

(10) Patent No.: US 10,104,330 B2
(45) Date of Patent: Oct. 16, 2018

(54) MULTIMEDIA CONTENT MINIMIZATION ON MUTE COMMAND

(71) Applicant: DISH Technologies, L.L.C., Englewood, CO (US)

(72) Inventor: Mark Felton, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 299 days.

(21) Appl. No.: 14/631,725

(22) Filed: Feb. 25, 2015

(65) Prior Publication Data

US 2016/0249007 A1    Aug. 25, 2016

(51) Int. Cl.
| | |
|---|---|
| H04N 5/45 | (2011.01) |
| H04N 5/60 | (2006.01) |
| H04N 5/44 | (2011.01) |
| H04N 21/439 | (2011.01) |
| H04N 21/44 | (2011.01) |
| H04N 21/45 | (2011.01) |
| H04N 21/431 | (2011.01) |

(52) U.S. Cl.
CPC .............. *H04N 5/45* (2013.01); *H04N 5/4403* (2013.01); *H04N 21/4316* (2013.01); *H04N 21/4396* (2013.01); *H04N 21/44016* (2013.01); *H04N 21/4532* (2013.01); *H04N 5/60* (2013.01)

(58) Field of Classification Search
CPC ... H04N 5/45; H04N 5/44513; H04N 21/4316
USPC ....... 348/563, 564, 565, 568, 561, 462, 581, 348/704; 725/36, 40, 42
See application file for complete search history.

(56) References Cited

U.S. PATENT DOCUMENTS

| | | | |
|---|---|---|---|
| 2009/0109338 A1* | 4/2009 | Furutani ............ | H04N 5/44591 348/565 |
| 2011/0234746 A1* | 9/2011 | Saleh ..................... | G06F 3/041 348/14.03 |
| 2016/0249085 A1* | 8/2016 | Ben-Atiya ......... | H04N 21/2547 |

* cited by examiner

*Primary Examiner* — Michael Lee
*Assistant Examiner* — Jean W Desir
(74) *Attorney, Agent, or Firm* — Seed IP Law Group LLP

(57) ABSTRACT

Various embodiments facilitate minimization of multimedia content currently being shown on a display in response to a mute command. In a first embodiment, a receiver is configured to provide multimedia content to an entertainment system and obtain commands from a control device. A user presses the control device's mute button and a mute command is transmitted from the control device to the receiver and the entertainment system. In response to the mute command, the entertainment system turns off its own audio and the receiver minimizes multimedia content currently being provided by the receiver to the entertainment system. In a second embodiment, the mute command is transmitted from the control device to the receiver. In response to the mute command, the receiver mutes and minimizes multimedia content currently being provided by the receiver to the entertainment system.

18 Claims, 5 Drawing Sheets

MULTIMEDIA CONTENT MINIMIZATION ON MUTE COMMAND

TECHNICAL FIELD

The present disclosure generally relates to minimization of multimedia content. More particularly, but not exclusively, the present disclosure relates to minimization of multimedia content currently being shown on a display in response to a mute command.

BACKGROUND

Most television programs contain commercial breaks that include numerous advertisements. The constant bombardment of advertisements often results in a poor user experience. One simple method to avoid advertisements is to use the television's mute function to turn off the audio during commercial breaks. This method, however, still forces users to view the advertisements during commercial breaks. Other attempts have been made to detect and remove advertisements during commercial breaks. These methods, however, are not practical either due to technical issues or legal issues.

BRIEF SUMMARY

In accordance with some embodiments described herein, multimedia content currently being shown on a display is minimized in response to a mute command. In some cases, the minimized multimedia content is superimposed over additional multimedia content, such as a black screen, an image, family photos, a slide show, a television channel, a movie, weather information, games, applications, or a combination thereof.

In a first embodiment, a receiver is configured to provide multimedia content to an entertainment system and obtain commands from a control device. A user presses the control device's mute button and a mute command is transmitted from the control device to the receiver and the entertainment system. In response to the mute command, the entertainment system turns off its own audio and the receiver minimizes multimedia content currently being provided by the receiver to the entertainment system. When the current multimedia content is minimized, the picture of the current multimedia content is reduced in size and superimposed over background.

In a second embodiment, when a user presses the control device's mute button, a mute command is transmitted from the control device to the receiver. In response to the mute command, the receiver mutes and minimizes multimedia content currently being provided by the receiver to the entertainment system. The muting of the current multimedia content may be carried out by the receiver by altering or suspending the audio data of the current multimedia content or by transmitting a control signal from the receiver to the entertainment system. Similar to the first embodiment, the picture of the current multimedia content is reduced in size and superimposed over a background when minimized.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1:
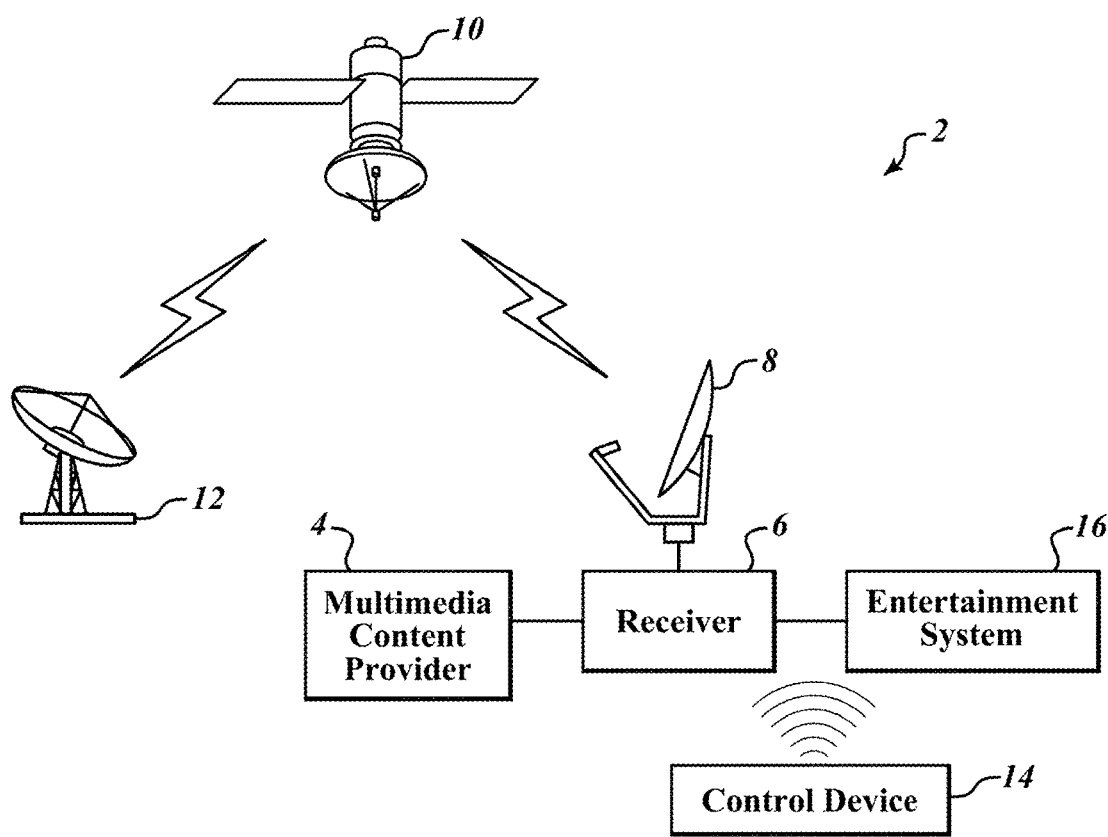
FIG. 1 is a block diagram illustrating an example of a system for multimedia content minimization on mute command according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known structures associated with the manufacturing of semiconductor wafers have not been described in detail to avoid obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 is a block diagram illustrating an example of a system 2 for multimedia content minimization on mute command according principles disclosed herein. In this example, the system 2 includes a multimedia content provider 4, a receiver 6, a receiver antenna 8, a satellite 10, a program content provider 12, a control device 14, and an entertainment system 16.

The multimedia content provider 4 is coupled to the receiver 6 and provides multimedia content to the receiver 6. The multimedia content provider 4 may be a satellite front-end, a cable television front-end, a digital video recorder (DVR), digital video disk (DVD), an electronic storage device, a computing device, or some other programming source. Multimedia content may include any type of content, such as television programs, movies, video games, images, text, and audio. The multimedia content provider 4 may be coupled to the receiver 6 through any type of communication media, now known or later developed. Non-limiting media examples include a world wide web, telephony systems, cable systems, fiber optic systems, microwave systems, asynchronous transfer mode ("ATM") systems, frame relay systems, digital subscriber line ("DSL") systems, radio frequency ("RF") systems, and satellite systems. In one embodiment the multimedia content provider 4 and the receiver 6 are enclosed in a single electronic device. It should be noted that, although only the multimedia content provider 4 is shown in FIG. 1, the system 2 may include any number of multimedia content providers.

The program content provider 12 is coupled to the receiver 6 through the receiver antenna 8 and the satellite 10. The program content provider 12 provides program content to the receiver 6. Program content includes programming data for multimedia content received from the multimedia content provider 4. For example, programming content may include scheduling data for television shows provided by a television network.

The receiver 6 is coupled the multimedia content provider 4, the receiver antenna 8, the control device 14, and the entertainment system 16. As previously described, the receiver 6 is configured to obtain multimedia content from the multimedia content provider 4 and program content from the program content provider 12. The receiver 6 may obtain multimedia content and program content continuously, periodically, upon notification of content being updated, or on-demand. The receiver 6 may be any suitable electronic device that is operable to receive and transmit data. The receiver 6 may be interchangeably referred to as a "TV converter," "receiving device," "set-top box," "TV receiving device," "TV receiver," "TV recording device," "satellite set-top box," "satellite receiver," "cable set-top box," "cable receiver," "media player," and "TV tuner." As will be discussed in detail with respect to FIGS. 4-7, the receiver 6 is configured to perform multimedia content minimization on mute command. Further, the receiver 6 may itself include user interface devices, such as buttons or switches, and the receiver 6 may be embodied in a single unit or in multiple units. The receiver 6 may also have cooperative logic located in the control device 14, the entertainment system 16, or elsewhere. The receiver 6 will be discussed in further detail with respect to FIG. 2.

The control device 14 is an electronic device that is configured to provide commands to the receiver 6, the entertainment system 16, or other devices. The control device 14 may provide commands using any type of wireless communication technology, such as infrared (IR), ZigBee, Z-Wave, and the like. The control device 14 includes a mute button, which is generally used to toggle a mute function on and off. The control device 14 may also include other optional buttons which can be used independently or in combination to provide additional commands to the control device 14, the entertainment system 16, or other devices. In one embodiment the control device 14 and the receiver 6 are enclosed in a single electronic device. In another embodiment the control device 14 is hard wired to the receiver 6.

The entertainment system 16 is coupled to the receiver 6. The entertainment system 16 is configured to obtain multimedia content from the receiver 6 and provide multimedia content to a user. In one embodiment, the entertainment system 16 includes a display and speakers. The entertainment system 16 will be discussed in further detail with respect to FIG. 3.

Figure 2:
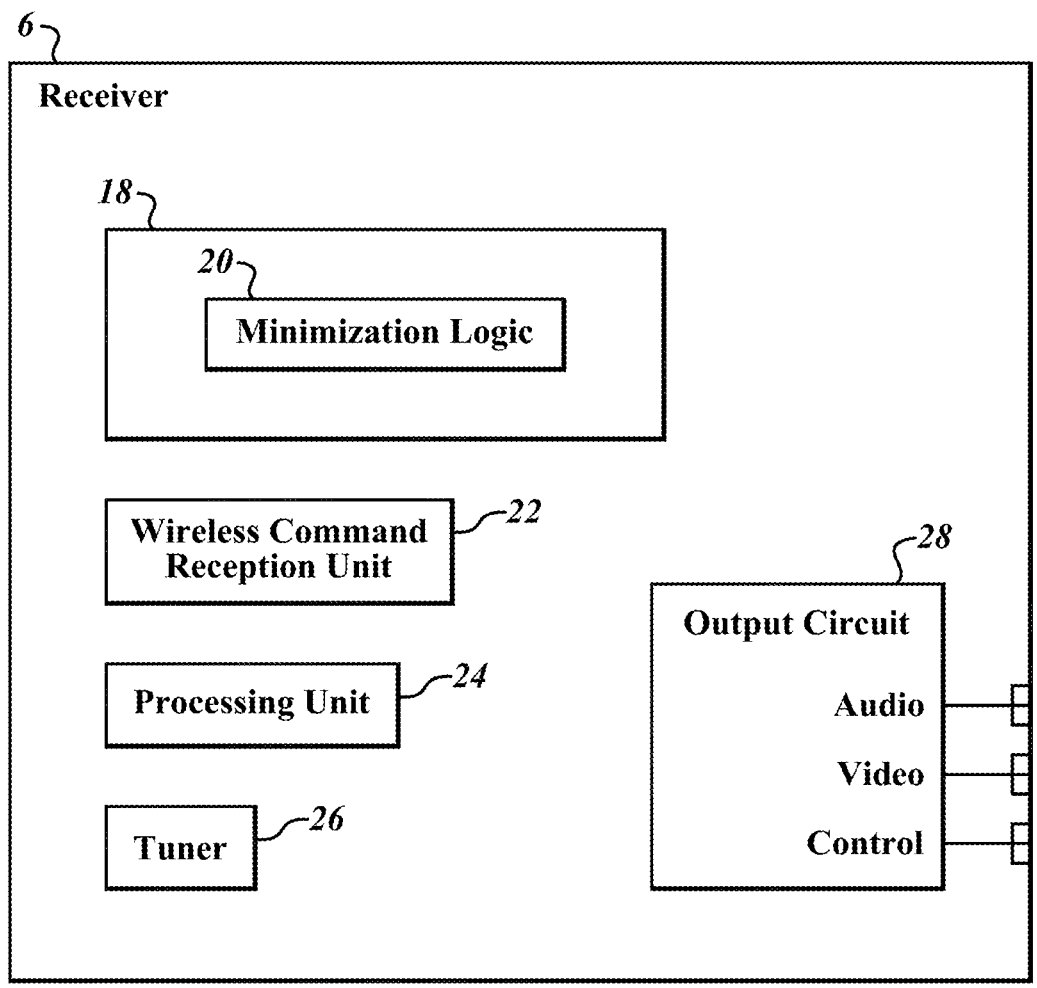
FIG. 2 is a schematic illustrating an example of the receiver of FIG. 1 according to one embodiment disclosed herein.

FIG. 2 is a schematic illustrating an example of the receiver 6 of the system 2 according to principles disclosed herein. In this example, the receiver 6 includes a memory 18, minimization logic 20, a wireless command reception unit 22, a processing unit 24, a tuner 26, and an output circuit 28.

The memory 18 is accessible by the processing unit 24 and is configured to store software that directs the processing unit 24. The memory 18 comprises any combination of non-transitory volatile and non-volatile computer-readable media for reading and writing.

The minimization logic 20 is stored in the memory 18. As will be discussed in detail with respect to FIGS. 4-7, the minimization logic 20 is configured to perform multimedia content minimization in response to a mute command.

The wireless command reception unit 22 is configured to receive commands from an electronic device, such as the control device 14. In many cases, the wireless command reception unit 22 receives IR signals from the control device 14. In other cases, the wireless command reception unit 22 may be based on some other wireless communication technology, such as ZigBee, Z-Wave, and the like.

The tuner 26 is configured to receive multimedia content from the multimedia content provider 4. The tuner 26 selects multimedia content that will be passed out of the receiver 6 via the output circuit 28.

The output circuit 28 is configured to output multimedia content received by the tuner 26 to the entertainment system 16. Specific output ports including an audio port, a video port, and a control information port are illustrated, though other ports and combinations of ports are also considered. The output circuit 28 may prepare output data for passage via the audio port and video port respectfully arranged in conformance with a high-definition multimedia interface (HDMI), a DISPLAYPORT interface, a video graphics array (VGA) interface, a digital visual interface (DVI), a serial interface, a parallel interface, or another interface. The output circuit 28 may prepare control data for passage via the control port according to a communications protocol such as USB, IEEE 1394, IEEE 802.3, IEEE 802.11, IEEE 802.15, RS-232, RS-422, RS-485, Infrared, $I^2C$, SPI, PCI, CAN, or some other protocol. The control port may conform to any serial, serialized, or parallel communications protocol. In many cases, the control port 56 is formed with a traditional serial port driven by a universal asynchronous receiver/transmitter (UART). In other cases, the control port is formed with a set of general purpose I/O (GPIO) pins desirably configured as data pins, clock pins, control pins, power pins, or the like.

Figure 3:
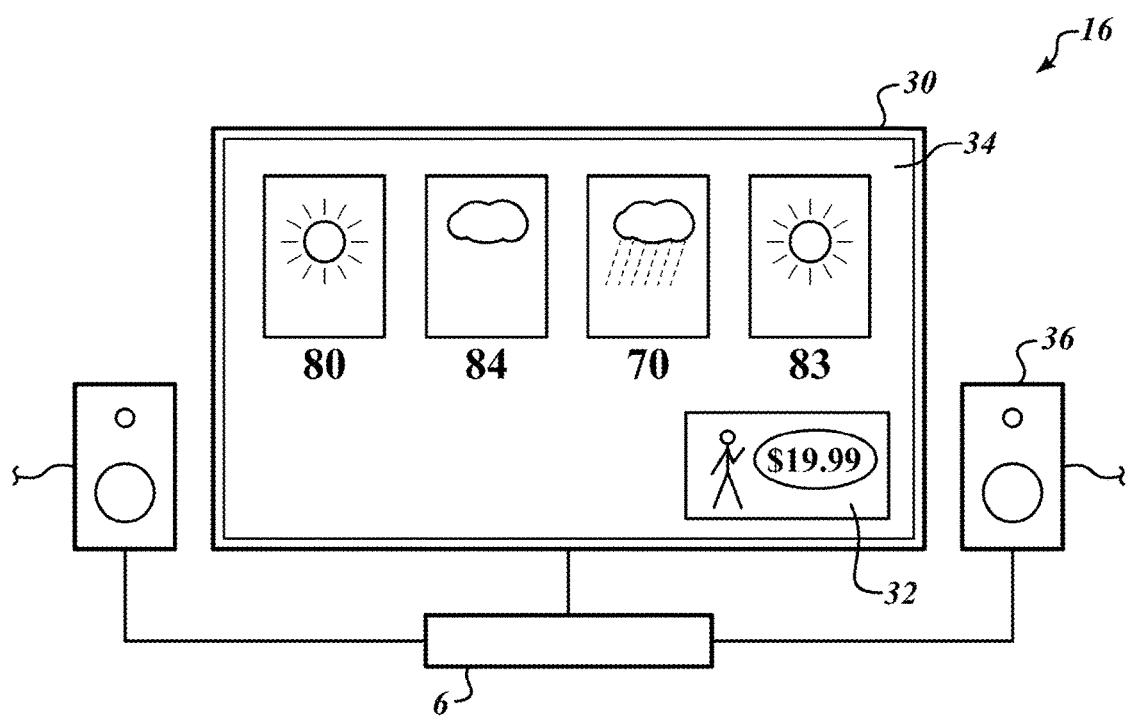
FIG. 3 is a view illustrating an example of the entertainment system and the receiver of FIG. 1 according to one embodiment disclosed herein.

FIG. 3 is a view illustrating an example of the entertainment system 16 and the receiver 6 according to principles disclosed herein. The entertainment system 16 is configured to provide multimedia content 30 to a user. In this example, the entertainment system 16 includes a display 30 and speakers 36 and is coupled to the receiver 6. Although the display 30 and the speaker 36 are shown as being wired to the receiver 6, wireless communications is also possible.

The display 30 is configured to provide video for multimedia content to a user. For example, the display 30 may be a conventional television set having one or more tuners. Alternatively, the display 30 may be a computing device with video output capability, such as laptop computers, desktop computers, or tablet devices. In the embodiment shown in FIG. 3, the display 30 shows the picture of minimized multimedia content 32 and the picture of background multimedia content 34. Multimedia content minimization will be discussed in further detail with respect to FIGS. 4-7.

The speakers 36 are configured to provide audio for multimedia content to a user. The speakers 36 are in the vicinity of the display 30 such that the user is able see video on the display 30 and hear audio from the speakers 36 simultaneously. In one embodiment the display 30 and the speaker 36 are enclosed in a single electronic device.

Figure 4:
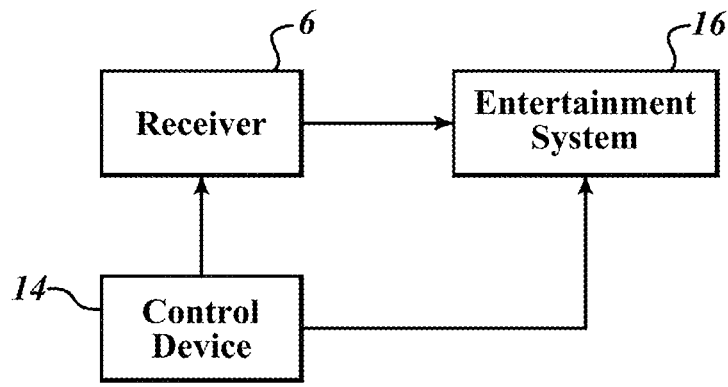
FIG. 4 is a block diagram illustrating an example of data flow for multimedia content minimization on mute command according to a first embodiment disclosed herein.

FIG. 4 is a block diagram illustrating an example of data flow for multimedia content minimization on mute command for a first embodiment according to principles disclosed herein.

In the embodiment shown in FIG. 4, data flows from the control device 14 to the receiver 6 and the entertainment system 16 and from the receiver 6 to the entertainment system 16. Particularly, as will be discussed in detail with respect to FIG. 5, when a user presses the control device's 14 mute button, a mute command is simultaneously transmitted to the receiver 6 and the entertainment system 16. Upon obtaining the mute command, the entertainment system 16 turns off or on its own audio and the receiver 6 minimizes or maximizes multimedia content currently being provided by the receiver 6 to the entertainment system 16. The receiver 6 then provides the minimized or maximized multimedia content to the entertainment system 16.

Figure 5:
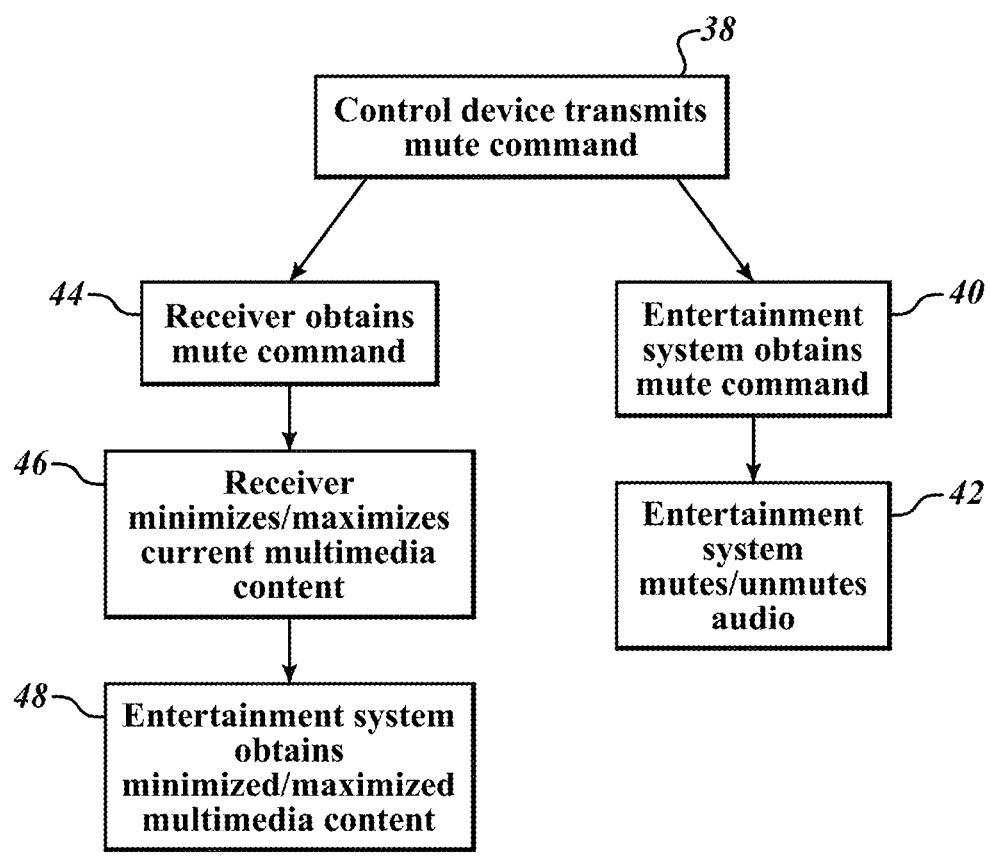
FIG. 5 is a flow diagram illustrating an example of multimedia content minimization on mute command according to the first embodiment disclosed herein.

FIG. 5 is a flow diagram illustrating an example of multimedia content minimization on mute command for the embodiment shown in FIG. 4 according to principles disclosed herein.

At a first part of the sequence 38, a user presses the control device's 14 mute button and a mute command is transmitted to the receiver 6 and the entertainment system 16. As previously described, the control device 14 may transmit the mute command using any type of wireless communication technology, such as IR, ZigBee, Z-Wave, and the like.

Subsequently, steps 40-42 are performed by the entertainment system 16 and steps 44-48 are performed by the receiver 6. In one embodiment, steps 40-42 and steps 44-48 are performed in parallel.

In step 40, the entertainment system 16 obtains the mute command from the control device 14.

Subsequently, in step 42, the entertainment system 16 mutes or unmutes its own audio depending on whether the mute command is a first mute command or a subsequent mute command. Particularly, the entertainment system 16 turns off the audio when the mute command is a first mute command and turns on the audio when the mute command is a subsequent mute command. The muting of the audio may be carried out by the entertainment system 16 muting its own audio output.

In step 44, the receiver 6 obtains the mute command from the control device 14.

Subsequently, in step 46, the receiver 6 minimizes or maximizes multimedia content currently being provided by the receiver 6 to the entertainment system 16 depending on whether the mute command is a first mute command or a subsequent mute command. Particularly, the receiver 6 minimizes multimedia content currently being provided to the entertainment system 16 when the mute command is a first mute command and maximizes multimedia content currently being provided to the entertainment system 16 when the mute command is a subsequent mute command.

When multimedia content is minimized, the picture of the multimedia content is reduced in size and displayed in a window inset in the display 30. The window is then superimposed over a background. For example, referring to FIG. 3, the picture of the minimized multimedia content 32 is minimized to the bottom right corner of the display 30 and is superimposed over the background multimedia content 34. In one embodiment, the picture of the multimedia content is reduced in size to still allow a user to perceive minimized multimedia content. That is, the multimedia content may continue to play while minimized. For example, if multimedia content is minimized during a commercial break, the commercials will continue to play such that a user may determine when the commercial break is over.

When multimedia content is maximized, the minimized multimedia content is set to its original state. That is, the picture of the minimized multimedia content is enlarged to its original size and is set to play current programming. For example, referring to FIG. 3, the picture of the minimized multimedia content 32 is returned to fill the full screen of the display 30 and play its current programming when maximized.

In one embodiment, multimedia content is minimized to a predetermined location of the display 30. For example, a user may preset multimedia content to be minimized to the bottom left corner, bottom right corner, the top left corner, or the top right corner of the display 30. In another embodiment, multimedia content is minimized to a default location of the display 30.

In another embodiment, minimized multimedia content is superimposed over a background that includes additional multimedia content. For example, referring to FIG. 3, the background multimedia content 34 includes weather information. The multimedia content set in the background may be any type of multimedia content. For example, the background may be a black screen, an image, family photos, a slide show, a television channel, a movie, weather information, games, applications, or a combination thereof. In one embodiment, a user may interact with the multimedia content set in the background. For example, a user may interact with the background multimedia content 34 by selecting another weather location to be displayed. Further, the type of multimedia content set in the background may be preselected by the user or may be set by default.

In a further embodiment, the receiver 6 selects the additional multimedia content for the background based on user data stored in the receiver 6. User data may include the user's location, viewing habits, viewing preferences, etc. For example, the receiver 6 may set weather information for the user's current location or a television channel that the user watches frequently to be included in the background.

The minimized or maximized multimedia content is then provided to the entertainment system 16 in step 48.

In an illustrating example of multimedia content minimization on mute command for the embodiment shown in FIGS. 4-5, a user is watching a television show and is presented with commercials. Annoyed with the commercials, the user presses the control device's 14 mute button. In response to the mute button being pressed, in step 38, a first mute command is transmitted to the receiver 6 and the entertainment system 16 simultaneously. In step 40, the entertainment system 16 obtains the first mute command from the control device 14. Upon obtaining the first mute command, the entertainment system 16 turns off its audio in step 42. Concurrently with steps 40-42, steps 44-48 are performed. In step 44, the receiver 6 obtains the first mute command from the control device 14. Upon obtaining the first mute command, in step 46, the receiver 6 minimizes the multimedia content currently being provided by the receiver 6 to the entertainment system 16 (i.e., the commercials) to the top left corner of the display 30. The receiver 6 also superimposes the minimized multimedia content over a background that includes family photos. The receiver 6 then provides the minimized multimedia content to the entertainment system 16 in step 48. When the commercials are over, the user presses the control device's 14 mute button again. In response to the mute button being pressed for a second time, returning to step 38, a second mute command is transmitted to the receiver 6 and the entertainment system 16 simultaneously. In step 40, the entertainment system 16 obtains the second mute command from the control device 14. Upon obtaining the second mute command, the entertainment system 16 turns its audio back on in step 42. At the same time, the receiver 6 obtains the second mute command from the control device 14 in step 44. Upon obtaining the second mute command, the receiver 6 maximizes the picture of the minimized multimedia content to fill the full screen of the display 30. The receiver 6 then provides the maximized multimedia content to the entertainment system 16 in step 48.

Figure 6:
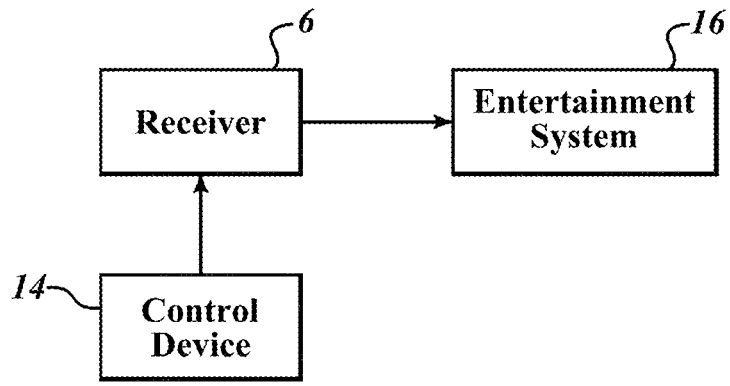
FIG. 6 is a block diagram illustrating an example of data flow for multimedia content minimization on mute command according to a second embodiment disclosed herein.

FIG. 6 is a block diagram illustrating an example of data flow for multimedia content minimization on mute command for a second embodiment according to principles disclosed herein.

In the embodiment shown in FIG. 6, data flows from the control device 14 to the receiver 6 and from the receiver 6 to the entertainment system 16. Particularly, when a user presses the control device's 14 mute button, a mute command is transmitted to the receiver 6. Upon obtaining the mute command, the receiver 6 turns off or on the audio and minimizes or maximizes multimedia content currently being provided by the receiver 6 to the entertainment system 16. The receiver 6 then provides the minimized or maximized multimedia content to the entertainment system 16.

Figure 7:
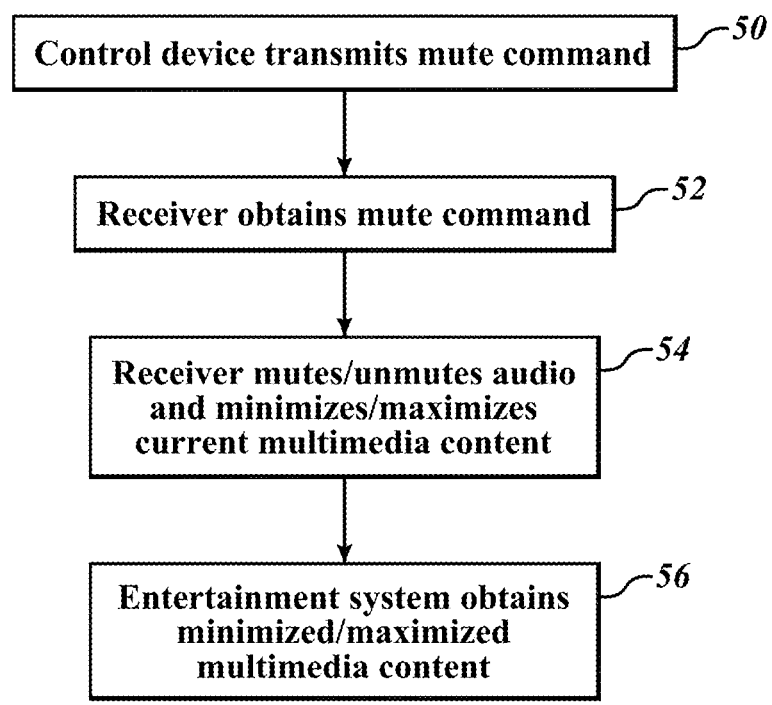
FIG. 7 is a flow diagram illustrating an example of multimedia content minimization on mute command according to the second embodiment disclosed herein.

FIG. 7 is a flow diagram illustrating an example of multimedia content minimization on mute command for the embodiment shown in FIG. 6 according to principles disclosed herein.

At a first part of the sequence 50, a user presses the control device's 14 mute button and a mute command is transmitted to the receiver 6. As previously described, the control device 14 may transmit the mute command using any type of wireless communication technology, such as IR, ZigBee, Z-Wave, and the like.

In step 52, the receiver 6 obtains the mute command from the control device 14.

In step 54, the receiver 6 mutes or unmutes the audio and minimizes or maximizes multimedia content currently being provided by the receiver 6 to the entertainment system 16 depending on whether the mute command is a first mute command or a subsequent mute command. Particularly, the receiver 6 turns off the audio and minimizes the current multimedia content when the mute command is a first mute command, and turns on the audio and maximizes minimized multimedia content when the mute command is a subsequent mute command. In one embodiment, the muting/unmuting and the minimizing/maximizing are synchronized to be performed at the same time.

The muting of the current multimedia content can be carried out in various ways. In one embodiment, audio data of the current multimedia content is altered (i.e., modified) to simulate silence. The simulation of silence may be carried out in some cases by setting all of the audio data to zero or null. The simulation of silence in other cases is carried out by setting the data in audio packets to a baseline level or some other simulation of quiet. In still other cases, the audio data is simulated as silence by setting the volume control in the data packets to a reduced level. The simulation of silence in these cases does not suspend the transmission of audio data packets. Instead, audio data packets are delivered to the entertainment system 16, and the processing by the entertainment system 16 results in low volume or silence as perceived by an associated user. In other embodiments, the muting of the current multimedia content is carried out by suspending audio data of the current multimedia content from communication to the entertainment system 16. In these cases, communication between the receiver 6 and the entertainment system 16 is maintained, but no audio data is communicated to the entertainment system 16. In still other embodiments, the muting feature is carried out by transmitting a control signal to the entertainment system 16. In these circumstances, the entertainment system 16 mutes its own audio output.

Similar to step 46, multimedia content is minimized by reducing the size of the picture of the multimedia content, displaying the multimedia content in a window inset in the display 30, and superimposing the window over a background. For example, referring to FIG. 3, the picture of the minimized multimedia content 32 is minimized to the bottom right corner of the display 30.

When multimedia content is maximized, the picture of minimized multimedia content is enlarged to the full screen of the display 30. For example, referring to FIG. 3, the picture of the minimized multimedia content 32 is returned to fill the full screen of the display 30 when maximized.

As previously described, the multimedia content may be minimized to a predetermined or default location of the display 30. In addition, minimized multimedia content may be superimposed over a background that includes additional multimedia content.

In one embodiment, the audio for the minimized multimedia content is replaced with other audio. That is, for the embodiments where the muting of the current multimedia content is carried out by altering or suspending the audio data of the current multimedia content, the receiver 6 may replace the audio of the current multimedia content with new audio. For example, instead of weather information, the background multimedia content 34 may be set to a music channel and the audio for the music channel may be turned on in place of the audio for the minimized multimedia content 32.

The minimized or maximized multimedia content is then provided to the entertainment system 16 in step 56.

In an illustrating example of multimedia content minimization on mute command for the embodiment shown in FIGS. 6-7, a user is watching a football game and half time occurs. Upset with the commentators of the half time show, the user presses the control device's 14 mute button. In response to the mute button being pressed, in step 50, a first mute command is transmitted to the receiver 6. In step 52, the receiver 6 obtains the first mute command from the control device 14. Upon obtaining the first mute command, in step 54, the receiver 6 turns off the audio of multimedia content currently being provided to the entertainment system 16 (i.e., the half time show) by altering or suspending the audio data of the current multimedia content. At the same time, the receiver 6 minimizes the picture of the current multimedia content to the top right corner of the display 30. The receiver 6 also superimposes the minimized multimedia content over a background that includes a music channel and turns on the audio for the music channel. The receiver 6 then provides the minimized multimedia content to the entertainment system 16 in step 48. When the half time show is over, the user presses the control device's 14 mute button again. In response to the mute button being pressed for a second time, returning to step 50, a second mute command is transmitted to the receiver 6. In step 52, the receiver 6 obtains the second mute command from the control device 14. Upon obtaining the second mute command, the receiver 6 turns off the audio for the music channel, turns on the audio for the minimized multimedia content, and maximizes the picture of the minimized multimedia content to fill the full screen of the display 30 in step 54. The receiver 6 then provides the maximized multimedia content to the entertainment system 16 in step 56.

The invention claimed is:

1. A method, comprising:
providing, by a receiving device, multimedia content to an electronic device, the multimedia content having audio and video;
obtaining, by the receiving device, a first mute command from a remote control device to mute audio of the multimedia content; and
minimizing, by the receiving device, the multimedia content in response to the obtaining of the first mute command, wherein, before being minimized, the multimedia content whose audio is to be muted is currently the only multimedia content being displayed on a screen of the electronic device, the minimizing of the multimedia content including:
turning off the audio of the multimedia content;
reducing a display size of the video of the multimedia content;
selecting background multimedia content having audio and video;
superimposing the video of the multimedia content over the video of the background multimedia content; and
turning on the audio of the background multimedia content.

2. The method according to claim 1, wherein the turning off of the audio of the multimedia content includes transmitting, by the receiving device, a second mute command to the electronic device.

3. The method according to claim 1, wherein the turning off of the audio of the multimedia content includes altering, by the receiving device, the audio of the multimedia content.

4. The method according to claim 1, wherein the turning off of the audio of the multimedia content includes suspending, by the receiving device, transmission of the audio of the multimedia content to the electronic device.

5. The method according to claim 1, wherein user data is stored in the receiving device and the background multimedia content is selected based on the user data.

6. The method according to claim 5, wherein the user data includes user location and viewing preferences.

7. The method according to claim 1, further comprising:
obtaining, by the receiving device, a second mute command from the remote control device; and
maximizing, by the receiving device, the minimized multimedia content in response to the obtaining of the second mute command, the maximizing of the minimized multimedia content including:
turning off the audio of the background multimedia content;
turning on the audio of the minimized multimedia content; and
enlarging the display size of the video of the minimized multimedia content.

8. A method, comprising:
providing, by a receiving device, first multimedia content to an electronic device, the first multimedia content including audio and video and the electronic device including a display and speakers;
displaying a video portion of the first multimedia content on the display in full size that fills the display;
obtaining, by the receiving device, a first mute command from a remote control device to mute the audio portion of the first multimedia content; and
minimizing, by the receiving device, the video portion of first multimedia content in response to the obtaining of the first mute command, wherein, before being minimized, the first multimedia content whose audio portion is to be muted is currently the only multimedia content being displayed on a screen of the electronic device, the minimizing of the first multimedia content including:
turning off the audio of the first multimedia content;
reducing on the display a display size of the video of the first multimedia content; and
superimposing the video in reduced size of the first multimedia content over a background on the display.

9. The method according to claim 8, wherein the turning off of the audio of the first multimedia content includes transmitting, by the receiving device, a second mute command to the electronic device.

10. The method according to claim 8, wherein the turning off of the audio of the first multimedia content includes altering, by the receiving device, the audio of the first multimedia content.

11. The method according to claim 8, wherein the turning off of the audio of the first multimedia content includes suspending, by the receiving device, transmission of the audio of the first multimedia content to the electronic device.

12. The method according to claim 8, wherein the background includes second multimedia content having audio and video.

13. The method according to claim 8, wherein the background includes a still image.

14. The method according to claim 8, further comprising:
obtaining, by the receiving device, a second mute command from the remote control device; and
maximizing, by the receiving device, the minimized first multimedia content in response to the obtaining of the second mute command, the maximizing of the minimized first multimedia content including:
turning on the audio of the minimized first multimedia content; and
enlarging the display size of the video of the minimized first multimedia content.

15. A method, comprising:
providing, by a receiving device, first multimedia content to an electronic device, the first multimedia content including audio and video;
obtaining, by the receiving device, a first mute command from a remote control device;
muting the audio of the first multimedia content in response to obtaining the first mute command; and
minimizing, by the receiving device, the first multimedia content in response to the obtaining of the first mute command, wherein, before being minimized, the first multimedia content whose audio is to be muted is currently the only multimedia content being displayed on a screen of the electronic device, minimizing of the first multimedia content including:
reducing a display size of the video of the first multimedia content; and
superimposing the video of the first multimedia content over a background.

16. The method according to claim 15, wherein the background includes second multimedia content having audio and video.

17. The method according to claim 15, wherein the background includes a still image.

18. A method comprising:
  providing, by a receiving device, first multimedia content to an electronic device, the first multimedia content including audio and video;
  obtaining, by the receiving device, a first mute command from a remote control device to mute audio of the first multimedia content;
  turning off the audio portion of the multimedia content in response to obtaining the first mute command;
  minimizing, by the receiving device, the first multimedia content in response to the obtaining of the first mute command, wherein, before being minimized, the first multimedia content whose audio portion is turned off is currently the only multimedia content being displayed on a screen of the electronic device, the minimizing of the first multimedia content including:
    reducing a display size of the video of the first multimedia content;
    superimposing the video of the first multimedia content over a background;
  obtaining, by the receiving device, a second mute command from the remote control device; and
  maximizing, by the receiving device, the minimized first multimedia content in response to the obtaining of the second mute command, the maximizing of the minimized first multimedia content including:
    turning on the audio of the minimized first multimedia content; and
    enlarging the display size of the video of the minimized first multimedia content.

* * * * *